United States Patent [19]

Kaneko et al.

[11] Patent Number: 5,278,750

[45] Date of Patent: Jan. 11, 1994

[54] PRODUCTION SCHEDULE MAKING METHOD

[75] Inventors: Kuniya Kaneko; Harumichi Wakiyama, both of Toyota; Tadasi Naito, Nagoya, all of Japan

[73] Assignee: Toyota Jidosha Kabushiki Kaisha, Toyota, Japan

[21] Appl. No.: 747,297

[22] Filed: Aug. 19, 1991

[30] Foreign Application Priority Data

Aug. 23, 1990 [JP] Japan ................................ 2-220022

[51] Int. Cl.[5] ...................... G06F 15/22; G06F 15/24; G06G 7/52
[52] U.S. Cl. .................... 364/401; 364/468; 235/376
[58] Field of Search .............. 364/401, 402, 403, 468; 235/376

[56] References Cited

U.S. PATENT DOCUMENTS

| | | | |
|---|---|---|---|
| 4,459,663 | 7/1984 | Dye | 364/200 |
| 4,472,783 | 9/1984 | Johnstone et al. | 364/474 |
| 4,580,207 | 4/1986 | Arai et al. | 364/138 |
| 4,591,983 | 5/1986 | Bennett et al. | 364/403 |
| 4,628,435 | 12/1986 | Tashiro et al. | 364/130 |
| 4,648,023 | 3/1987 | Powell | 364/156 |
| 4,669,047 | 5/1987 | Chucta | 364/468 |
| 4,796,194 | 1/1989 | Atherton | 364/468 |
| 4,802,094 | 1/1989 | Nakamura et al. | 364/468 |
| 4,829,445 | 5/1989 | Burney | 364/478 |
| 4,958,292 | 9/1990 | Kaneko et al. | 364/403 |
| 5,063,506 | 11/1991 | Brockwell et al. | 364/403 |

FOREIGN PATENT DOCUMENTS 63-265791  11/1988  Japan .
1-234142   9/1989   Japan .
63-202297  2/1990   Japan .

*Primary Examiner*—Donald E. McElhenry, Jr.
*Assistant Examiner*—Laura Brutman
*Attorney, Agent, or Firm*—Kenyon & Kenyon

[57] ABSTRACT

A method for making a production schedule of an instant process which produces a plurality types of products and supplies the products to a plurality of following processes by trucks. A truck delivery schedule including a number of truck deliveries and times is taken into account when the production schedule of the instant process is made. On the production schedule, a production order of the products is determined, and a stocking schedule also is made on the production order schedule.

12 Claims, 23 Drawing Sheets

FIG. 2

FOLLOWING PROCESS SCHEDULE
(NUMBERS OF PRODUCTS NEEDED BY FOLLOWING PROCESS)

| | 29 (WED) | 30 (THU) | 31 (FRI) | 1 (SAT) | 2 (SUN) | 3 (MON) | 4 (TUE) |
|---|---|---|---|---|---|---|---|
| FOLLOWING PROCESS A PRODUCT a | 4 | 4 | 4 | 0 | 0 | 12 | 12 |
| PRODUCT b | 12 | 12 | 12 | 0 | 0 | 4 | 4 |

SWITCHING OF CYCLE TABLE BY OPERATOR

FIG. 3

TRUCK DELIVERY SCHEDULE
(ARRIVAL TIMES AT FOLLOWING PROCESS)

| | 1ST | 2ND | 3RD | 4TH | KANBAN INSTRUCTION |
|---|---|---|---|---|---|
| FOLLOWING PROCESS A | 10:00 | 15:00 | 23:00 | 4:00 | 1-4-2 |

FIG. 6

PRODUCTION SCHEDULE OF THE INSTANT PROCESS

| | 9:00 | 10:00 | 14:00 | 15:00 | 22:00 | 23:00 | 3:00 | 4:00 | 9:00 | 10:00 |
|---|---|---|---|---|---|---|---|---|---|---|
| | | | | 31 (FRI) | | | | | 3 (MON) | |
| A-a | | 1 | 1 | | 3 | 3 | 3 | 3 | 3 | 3 |
| A-b | 3 | 3 | 3 | | 1 | 1 | 1 | 1 | 1 | 1 |

SWITCHING OF CYCLE TABLE

PRODUCTION ORDER SCHEDULE OF THE INSTANT PROCESS

| 31ST/ 8:00 | 9 | 10 | 11 | 13 | 14 | 15 | 16 | 21 | 22 | 23 | 24 | 2 | 3 | 4 | 5:00 |
|---|---|---|---|---|---|---|---|---|---|---|---|---|---|---|---|
| 1 | 2 | 3 | -1 | 0 | 8 | 5 | 13 | 10 | 7 | 4 | 12 | 9 | 6 | 3 | 11 |
| 4 | 3 | 2 | 6 | 5 | 3 | 6 | -2 | 1 | 4 | 7 | -1 | 2 | 5 | 8 | 11 |
| b | b | a | b | b | a | b | a | a | a | b | a | a | a | b | a | a
b

↑ SWITCHING OF CYCLE TABLE BY OPERATOR

FOLLOWING PROCESS SCHEDULE
(IN A CASE OF NORMAL WORKING)

| | 29 (WED) | 30 (THU) | 31 (FRI) | 1 (SAT) | 2 (SUN) | 3 (MON) | 4 (TUE) |
|---|---|---|---|---|---|---|---|
| FOLLOWING PROCESS A PRODUCT a | 4 | 4 | 4 | 0 | 0 | 18 | 18 |
| PRODUCT b | 12 | 12 | 12 | 0 | 0 | 6 | 6 |

SWITCHING OF CYCLE TABLE BY OPERATOR

FIG. 11

SCHEDULE WITH RESPECT TO EXTRA WORKING

| | 30 (THU) | 31 (FRI) | 1 (SAT) EXTRA WORKING | 3 (MON) | 4 (TUE) |
|---|---|---|---|---|---|
| FOLLOWING PROCESS A | | | 8 | −8 | |

PRODUCTION CHANGE AT AN INSTANT PROCESS

DELIVERY IN EXTRA WORKING DAY

REDUCTION IN DELIVERY

FIG. 12

MODIFIED FOLLOWING PROCESS SCHEDULE
(NUMBER OF PRODUCTS NEEDED BY FOLLOWING PROCESS)

|   | 29 | 30 | 31 | 1 | 2 | 3 | 4 |
|---|----|----|----|---|---|---|---|
| A-a | 4 | 4 | 4 | 6 | 0 | 15 | 15 |
| A-b | 12 | 12 | 12 | 2 | 0 | 5 | 5 |

FIG. 13

TRUCK DELIVERY SCHEDULE
(ARRIVAL TIMES AT FOLLOWING PROCESS)

| | 1 ST | 2 ND | 3 RD | 4 TH | KANBAN INSTRUCTION |
|---|---|---|---|---|---|
| FOLLOWING PROCESS A NORMAL | 10:00 | 15:00 | 23:00 | 4:00 | 1 - 4 - 2 |
| EXTRA | 10:00 | 15:00 | | | |

FIG. 19

PRODUCTION ORDER SCHEDULE OF THE INSTANT PROCESS

| | 31/8:00 | 9:00 | 10:00 | 11:00 | 13:00 | 14:00 | 15:00 | 16:00 | 17:00 | 18:00 | 19:00 | 21:00 | 22:00 | 23:00 | 24:00 | 2:00 |
|---|---|---|---|---|---|---|---|---|---|---|---|---|---|---|---|---|
| a | 2 | 4 | 1 | 3 | 0 | 11 | 7 | 18 | 14 | 10 | 6 | 17 | 3 | -1 | 10 | 6 |
| b | 3 | 1 | 4 | 2 | 5 | 4 | 8 | -3 | 1 | 5 | 9 | -2 | 2 | 6 | -5 | -1 |
| | b | a | b | a | b | a | b | a | a | a | b | a | a | b | a | a |

SWITCHING OF SYSTEM CYCLE TABLE

| | 3:00 | 4:00 | 5:00 | 6:00 |
|---|---|---|---|---|
| | 2 | 13 | 9 | 5 |
| | 3 | -8 | -4 | 0 |
| | b | a | a | a |

FIG. 21

FOLLOWING PROCESS SCHEDULE
(IN A CASE OF NORMAL WORKING)

| | 29 (WED) | 30 (THU) | 31 (FRI) | 1 (SAT) | 2 (SUN) | 3 (MON) | 4 (TUE) |
|---|---|---|---|---|---|---|---|
| FOLLOWING PROCESS A PRODUCT a | 4 | 4 | 4 | 0 | 0 | 20 | 19 |
| PRODUCT b | 12 | 12 | 12 | 0 | 0 | 7 | 6 |

SWITCHING INSTRUCTION OF CYCLE TABLE BY OPERATOR

FIG. 22

SCHEDULE WITH RESPECT TO EXTRA WORKING

| | 30 (THU) | 31 (FRI) | 1 (SAT) EXTRA WORKING | 3 (MON) | 4 (TUE) |
|---|---|---|---|---|---|
| FOLLOWING PROCESS A | PRODUCT DELIVERY MODIFICATION / PRODUCTION CHANGE | | 12 | | PRODUCTION REDUCTION PERIOD OF TIME |

FIG. 23

MODIFIED FOLLOWING PROCESS SCHEDULE
(NUMBERS OF PRODUCTS NEEDED BY FOLLOWING PROCESS)

|     | 29 | 30 | 31 | 1 | 2  | 3  | 4 |
|-----|----|----|----|---|----|----|---|
| A-a | 4  | 4  | 9  | 0 | 0  | 15 | 15|
| A-b | 12 | 12 | 12 | 3 | 0  | 5  | 5 |

FIG. 24

TRUCK DELIVERY SCHEDULE
(ARRIVAL TIMES AT FOLLOWING PROCESS)

| FOLLOWING PROCESS A | | 1 ST  | 2 ND  | 3 RD  | 4 TH | KANBAN CONDITION |
|---|---|---|---|---|---|---|
| | NORMAL | 10:00 | 15:00 | 23:00 | 4:00 | 1 - 4 - 2 |
| | EXTRA  | 10:00 | 15:00 |       |      | EXTRA WORKING KANBAN |

PRODUCT SHIPMENT SCHEDULE
OF THE INSTANT PROCESS (PRODUCT a)

(PRODUCT b)

FIG. 27

WORKING CONDITION AND PRODUCTION CONDITION
OF THE INSTANT PROCESS

| | PRODUCTION START 1 | END 1 | START 2 | END 2 | REST START 1 | END 1 | START 2 | END 2 |
|---|---|---|---|---|---|---|---|---|
| THE INSTANT PROCESS, NORMAL | 8:00 | 17:00 | 21:00 | 6:00 | 12:00 | 13:00 | 1:00 | 2:00 |
| EXTRA | 8:00 | 17:00 | | | 12:00 | 13:00 | | |

| EXTRA WORKING 1 | EXTRA WORKING 2 | LEAD TIME | TACT-TIME |
|---|---|---|---|
| 2 HR | 2 HR | 1 HR | 1 HR |
| | | 1 HR | 1 HR |

PRODUCTION SCHEDULE OF THE INSTANT PROCESS

FIG. 30

PRODUCTION ORDER SCHEDULE OF THE INSTANT PROCESS

| 31/8:00 | 9:00 | 10:00 | 11:00 | 13:00 | 14:00 | 15:00 | 16:00 | 17:00 | 18:00 | 21:00 | 22:00 | 23:00 | 24:00 | 2:00 | 3:00 | 4:00 | 5:00 |
|---|---|---|---|---|---|---|---|---|---|---|---|---|---|---|---|---|---|
| 2 | 4 | 0 | 2 | 4 | 0 | 13 | 8 | 21 | 16 | 11 | 6 | 19 | 14 | 9 | 4 | 17 | 12 |
| 4 | 2 | 6 | 4 | 2 | 9 | 5 | 10 | −3 | 2 | 7 | 12 | −1 | 4 | 9 | 14 | 1 | 6 |
| b | a | b | b | a | b | a | b | a | a | a | b | b | a | a | b | a | a |

SWITCHING OF SYSTEM CYCLE TABLE

| 6:00 | 7:00 | 8:00 | 9:00 | 10:00 | 11:00 | 13:00 | 14:00 | 15:00 | 16:00 |
|---|---|---|---|---|---|---|---|---|---|
| 7 | 20 | 5 | 0 | 13 | 8 | 3 | 2 | 5 | 2 |
| 11 | −2 | 3 | 8 | −5 | 0 | 1 | 2 | −1 | 0 |
| b | a | a | b | a | a | a | b | a | a | a
b

PRODUCTION SCHEDULE MAKING METHOD

BACKGROUND OF THE INVENTION

1. Field of the Invention

The present invention relates to a method for making a production schedule for an instant process in a case where the instant process produces a plurality of types of products and supplies the products to a plurality of following processes by trucks, taking a truck delivery schedule also into account.

2. Description of the Prior Art

Japanese Patent Publication NO. SHO 63-265791 discloses a method in which a plurality of types of products (for example, engines) produced at an instant process (for example, an engine assembly line) are delivered by trucks to following processes (for example, car assembly lines) by a production schedule that determines a production number of products and a production order of different types of products, and that controls inventory or stocking by merely advancing the numbers of products needed at the following processes by periods of time necessary to deliver the products from the instant process to the following processes. When a working condition of the instant process is different from a working condition of the following process, the time to be advanced is measured on the basis of an actual working time.

However, in this prior production scheduling method, only the transportation times are taken into consideration; the numbers and times of truck deliveries are not considered. Since the flow of products will change corresponding to a change in the numbers and times of the truck deliveries, production at the instant process and the following processes may suffer a lack of supply of products from the instant process to the following process or an excess stock at the instant process or at the following process, if the truck delivery schedules are not taken into account.

SUMMARY OF THE INVENTION

An object of the invention is to provide a production schedule making method of an instant process which can prevent both a lack of supply of products from an instant process to following processes and an excess stock at the instant process and the following processes.

The above-described object is attained by a method according to the present invention for making a production schedule for an instant process that produces a plurality of types of products and supplies the products to a plurality of following processes by trucks. The method includes steps of entering a following process schedule which includes numbers of products needed by the following processes with respect to respective product types and respective days; entering a truck delivery schedule from the instant process to the following process and information about delivery of product types (this information being included in a card, called a KANBAN, that is carried by each truck between the instant process and the following process); determining a product shipment schedule of the instant process based on the following process schedule, the truck delivery schedule, and the KANBAN information about delivery of product types; entering a working condition and a production condition of the instant process; determining a production schedule of the instant process based on the product shipment schedule, the working condition, and the production condition of the instant process; and determining a production order of the products to be produced at the instant process based on the production schedule of the instant process.

In the above-described method, since the production schedule of the instant process is determined by taking into account not only the following process schedule but also a truck delivery schedule, an optimum production order will be obtained at the instant process to prevent both a lack of supply from the instant process to the following processes and excess inventory or stock at the instant process and the following processes.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which:

FIG. 2 is a table of numbers of products needed per day by a following process, in accordance with a following process schedule in a first embodiment of the present invention;

FIG. 3 is a table of daily arrival times at the following process in accordance with a truck delivery schedule in the first embodiment of the present invention;

FIG. 6 is a table illustrating a production schedule of the instant process in accordance with the first embodiment of the present invention;

FIG. 8 is a table illustrating a production order schedule of the instant process in accordance with the first embodiment of the present invention;

FIG. 10 is a table illustrating a following process schedule in a case where the following process has a normal work schedule, in accordance with a second embodiment of the present invention;

FIG. 11 is a table illustrating a schedule similar to that of FIG. 10, but for a following process having a non-normal (extra working) schedule, in accordance with the second embodiment of the present invention;

FIG. 12 is a table of numbers of products needed by the following process for a modified following process schedule in accordance with the second embodiment of the present invention;

FIG. 13 is a table of arrival times at the following process for a truck delivery schedule in accordance with the second embodiment of the present invention;

FIG. 19 is a table illustrating a production order schedule of the instant process in accordance with the second embodiment of the present invention;

FIG. 21 is a table illustrating a following process schedule in a case where the following process has a normal work schedule in accordance with a third embodiment of the present invention;

FIG. 22 is a table illustrating a schedule for a following process that has an extra working schedule in accordance with the third embodiment of the present invention;

FIG. 23 is a table of numbers of products needed by the following process for a modified following process schedule in accordance with the third embodiment of the present invention;

FIG. 24 is a table of arrival times at the following process for a truck delivery schedule in accordance with the third embodiment of the present invention;

FIG. 27 is a table illustrating a working condition and a production condition of the instant process in accordance with the third embodiment of the present invention;

FIG. 30 is a table illustrating a production order of the instant process in accordance with the third embodiment of the present invention.

DETAILED DESCRIPTION OF THE PREFERRED EMBODIMENTS

Figure 1:
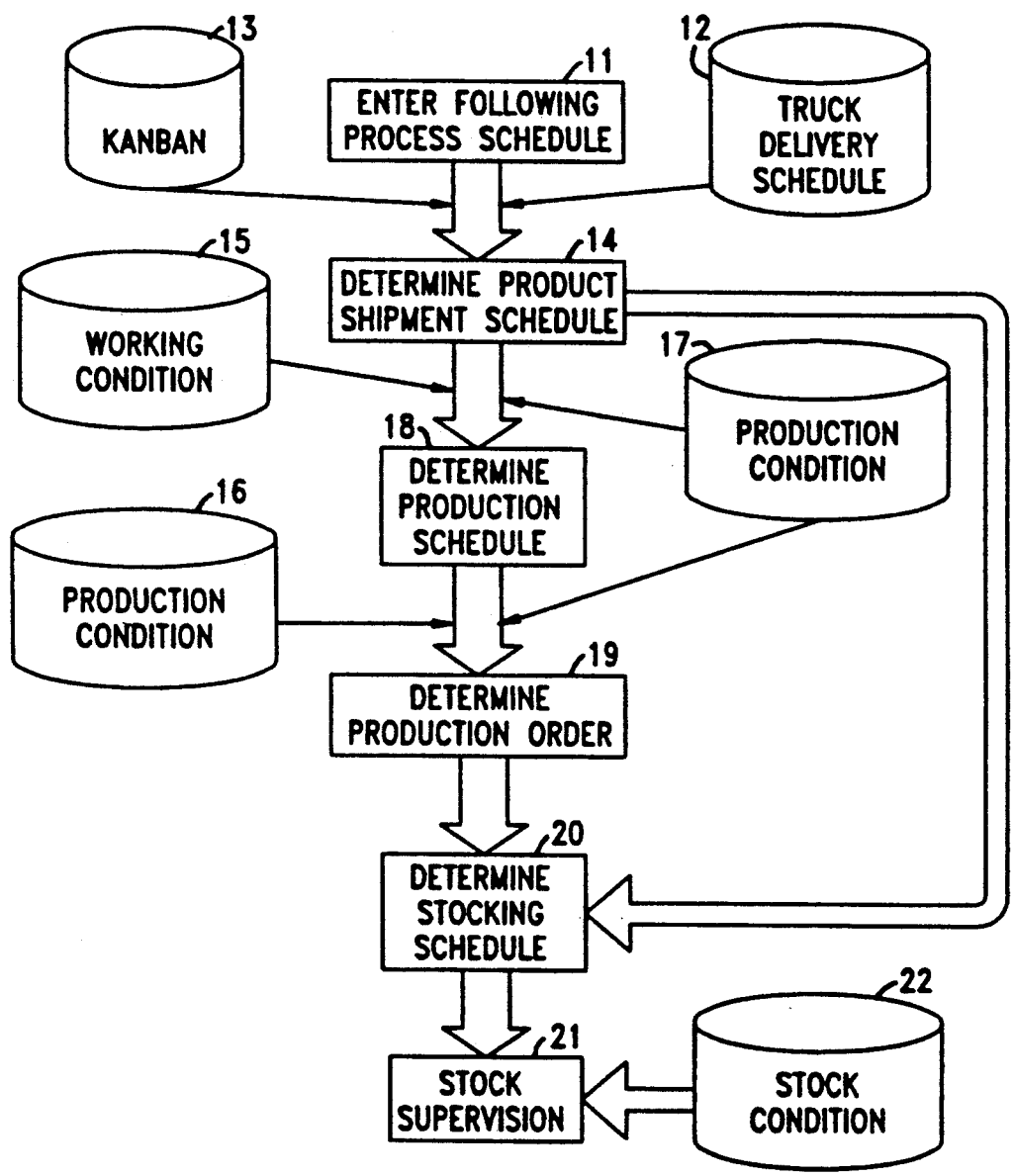
FIG. 1 is a system flow chart illustrating a production scheduling method in accordance with the present invention, applicable to any embodiment of the present invention.

Three embodiments will be explained. A first embodiment corresponds to a case where a following process has a normal work schedule only, and is illustrated in FIGS. 1-9. A second embodiment corresponds to a case where a following process has an extra working schedule and product shipment is instructed by a normal KANBAN, and is illustrated in FIGS. 10-20. A third embodiment corresponds to a case where a following process has an extra working schedule and product shipment is instructed by a special KANBAN, and is illustrated in FIGS. 21-31. FIG. 1 is applicable to any embodiment of the invention.

The first embodiment will be explained first. As illustrated in FIG. 1, a following process schedule is entered at step 11. As shown in FIG. 2, the following process schedule includes information about numbers of product types a, b, c, . . . needed by each of the following processes A, B, C, . . . (for example, car assembly lines) on respective days. For example, FIG. 2 shows that following process A needs four products of type a and twelve products of type b on each of the 29th day, the 30th day, and the 31st days of a month, needs no product on each of the 1st day and the 2nd day of the following month because they fall on a weekend, and needs twelve products of type a and four products of type b on each of the 3rd day and the 4th day. FIG. 2 also shows a switching by an operator on the 3rd day when the production requirements of the following processes are changed from those of the previous week.

A truck delivery schedule is then entered at step 12 of FIG. 1, and information is entered from a card (called a KANBAN) at step 13 of FIG. 1. A KANBAN is here defined as an instruction card which is carried between the instant process and the following processes by trucks and which includes an instruction or information about production and delivery of products. This entered information is stored in a memory of a computer. FIG. 3 illustrates a typical example of such a truck delivery schedule. The truck delivery schedule of FIG. 3 shows that trucks arrive at the following process A at ten, fifteen, twenty-three, and four o'clocks per 24-hour day (which, in the example of this application, starts at 8.00 am rather than the traditional hour of midnight) in a case of a normal working condition in which there is no working at the following process on weekends and holidays. FIG. 3 also includes a KANBAN information "1-4-2". This KANBAN information "1-4-2" means that there are "four" truck deliveries with respect to "one" day and that detailed information on the products carried by a given truck is delivered to the following process by a "2nd" preceding delivery truck, which carries the corresponding KANBAN. Therefore, there is a time lag corresponding to two truck deliveries between delivery of a KANBAN and delivery of the products listed on the KANBAN, in the delivery of type "1-4-2".

At step 14 of FIG. 1, a product shipment schedule of the instant process is made based on the following process schedule, the truck delivery schedule, and the KANBAN information. One of the features of the invention is that the product shipment schedule of the instant process is made by taking the truck delivery schedule also into account.

Figure 4:
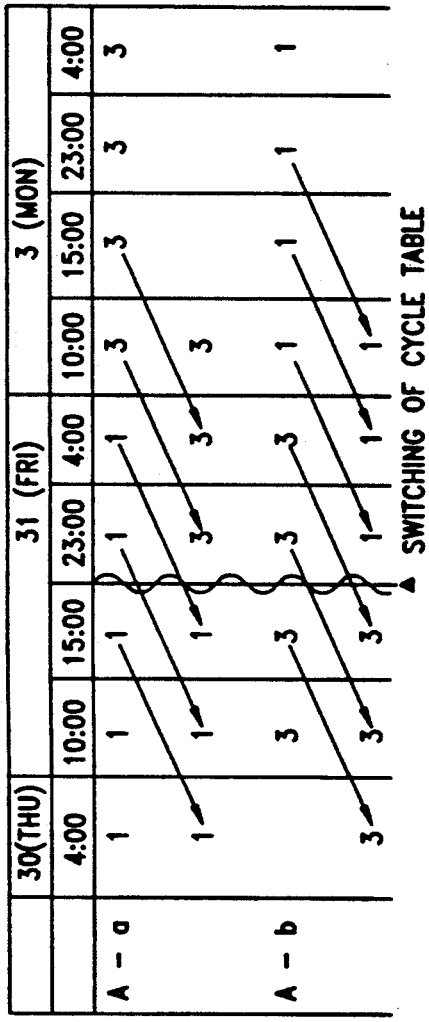
FIG. 4 is a table of a product shipment schedule of an instant process corresponding to each truck arrival on each day at a following process in accordance with the first embodiment of the present invention.

FIG. 4 illustrates how to make the product shipment schedule of the instant process. More particularly, the number of products of each type needed by each following process (in this case, process A) in a day is divided by the number of truck deliveries on the day, and the divided numbers are inserted in "process-product" lines A-a and A-b of FIG. 4. For example, four products of type a are needed on Friday the 31st and twelve products of type a are needed on Monday the 3rd, respectively, by the following process A, and these numbers are divided by the number of truck deliveries per day (4) to obtain the numbers 1 and 3. These numbers 1 and 3, which are inserted in line A-a, mean that the products represented by the numbers should reach the following process A by the respective truck delivery times of Friday the 31st and Monday the 3rd.

If the product delivery schedule at the instant process of FIG. 4 is determined so that the products should be ready for dispatch or shipment from the instant process at times preceding the respective truck arrival times at the following process by the time lag between delivery of the KANBAN and delivery of the products that is specified in the KANBAN ("2" of "1-4-2"), the numbers 1 and 3 inserted in line A-a are advanced by the time lag of "two" truck deliveries to determine the product shipment schedule of the instant process. For example, the one product of type a which reaches the following process at fifteen o'clock on Friday the 31st should be listed on the KANBAN of the truck that makes the delivery at four o'clock on Thursday the 30th and should be ready for shipment from the instant process by that time. Similarly, the three products of type a which reach the following process at ten o'clock on Monday the 3rd should be listed on the KANBAN of the truck that arrives at the following process at twenty-three o'clock on Friday the 31st, and the three type a products should be ready for dispatch by that time. The product delivery schedule of the instant process of FIG. 4 shows this time advance by arrows. This advance also means that, as shown in FIG. 4, the switching of the cycle table for completion of products ready for shipment from the instant process will occur at 15:00 o'clock on Friday the 31st, to correspond to the switching of the cycle table for arrival of products at the following process A that occurs at 8:00 o'clock on Monday the 3rd (as shown in FIG. 2).

Figure 5:
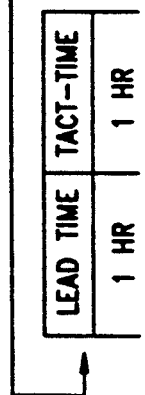
FIG. 5 is a table illustrating a working condition and a production condition of the instant process in accordance with the first embodiment of the present invention.

A working condition of the instant process and a production condition of the instant process are entered at step 15 and step 17 of FIG. 1, respectively. Typical examples of these conditions are illustrated in FIG. 5. For example, in a normal or ordinary working condition having no work on a weekend or holiday, there are two work shifts, that is, a first shift from eight to seventeen o'clock and a second shift from twenty-one to six o'clock, and two rest periods, that is, a rest period for the first shift from twelve to thirteen o'clock and a rest period for the second shift from one to two o'clock. Also, in the example of FIG. 5, one hour is provided as a lead time, which is defined as a time by which completion of production should precede dispatching of products, and one hour is provided as a tact-time, which is defined as a time needed to produce one product.

A production schedule of the instant process with respect to product types a and b is made at the next step 18 of FIG. 1. This production schedule of the instant process is made based on the product shipment schedule of FIG. 4, the working condition of the instant process entered at step 15 of FIG. 1, and the production condition of the instant process entered at step 17 of FIG. 1, these two conditions being shown in FIG. 5.

Figure 7:
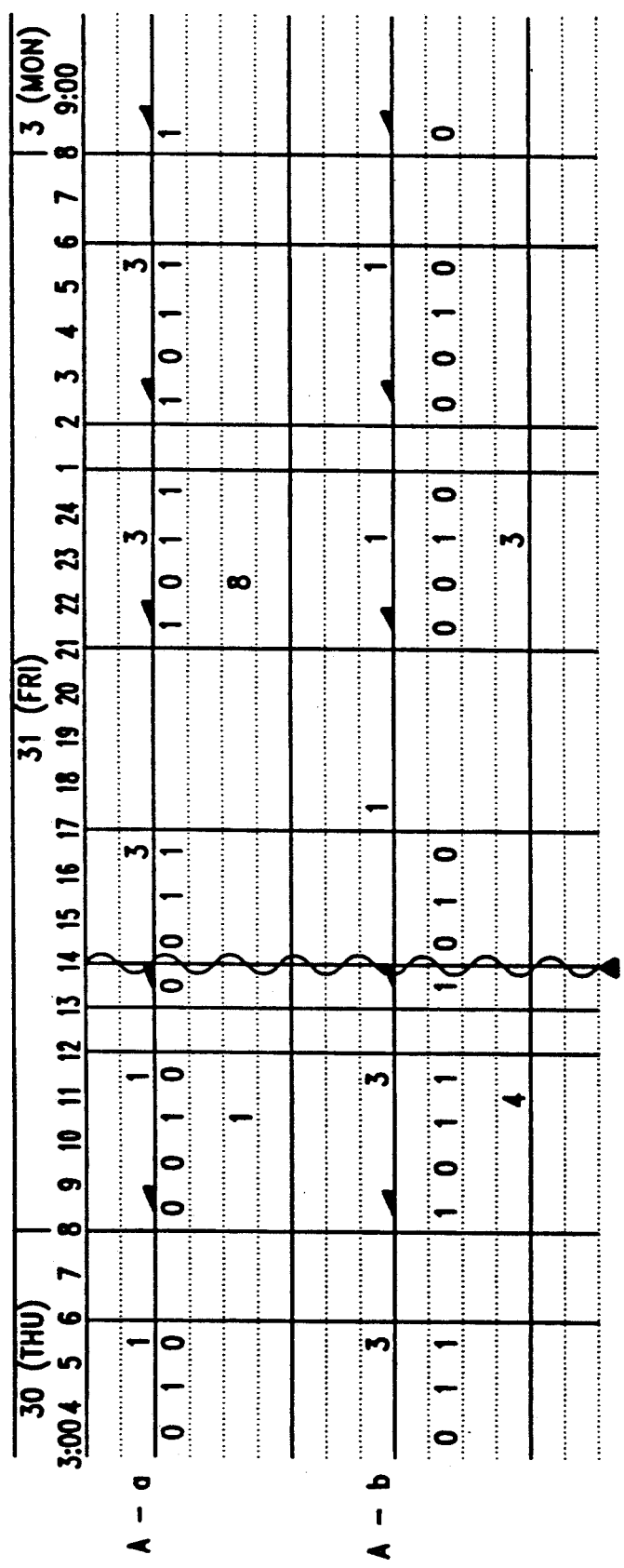
FIG. 7 is a table illustrating a detailed production schedule of the instant process in accordance with the first embodiment of the present invention.

FIGS. 6 and 7 illustrate how to make the production schedule of the instant process. In FIG. 6, the second, fourth, sixth, and eighth columns under "31(FRI)" represent the four truck delivery times at following process A, and columns one, three, five, and seven represent corresponding times advanced by the lead time of FIG. 5 (one hour). The numbers inserted in "process-product" lines A-a and A-b are the same as the shifted numbers in the product shipment schedule of FIG. 4. These numbers are then further advanced, as shown by the arrows to the lines below the "process-product" lines, by the lead time (for example, one hour) specified in FIG. 5. Production of the products represented by these numbers should be completed by the times of the columns to which the numbers are advanced. For example, on Friday the 31st, production of one product of type a should be completed by nine o'clock, production of one product of type a should be completed by fourteen o'clock, production of three products of type a should be completed by twenty-two o'clock, and production of three products of type a should be completed by three o'clock, so that they will be ready for dispatch, respectively, at ten, fifteen, twenty-three, and four o'clock. The cycle table switching time is also shifted by one hour (from 15:00 in FIG. 4 to 14:00 in FIG. 6).

FIG. 7 illustrates a more detailed production schedule of the instant process wherein the numbers of products of FIG. 6 are distributed over actual working periods of time as evenly as possible. FIG. 7 has hourly columns grouped into working, rest, and shift change periods according to the working condition schedule of FIG. 5. In particularly, according to FIG. 5, the actual working periods for each working day include periods from eight to twelve o'clock, from thirteen to seventeen o'clock, from twenty-one to one o'clock, and from two to six o'clock. For example, corresponding to the product completion numbers in FIG. 6 (1 in the 9:00 o'clock column, 1 in the 14:00 o'clock column, 3 in the 22:00 o'clock column, 3 in the 3:00 o'clock column of the 31st, and 3 in the 9:00 o'clock columns of the 3rd day of the next month), in FIG. 7, a number 1 is inserted in the working period prior to the group that contains nine o'clock, a number 1 is inserted in the working number 3 is inserted in the working period prior to the group that contains twenty-two o'clock, a number 3 is inserted in the working period prior to the group that contains nine o'clock of the next working day.

Then, these numbers inserted in the "process-product" lines A-a and A-b of FIG. 7 are then distributed as evenly as possible over respective actual working periods of time as shown in the next line below each of the "process-product" lines. Therefore, for example, the one product of type a which should be completed by nine o'clock on Friday the 31st is produced from four to five o'clock on Thursday the 30th, and the one product of type a which should be completed by fourteen o'clock on the 31st is produced from ten to eleven o'clock on the same day. Of the three products of type a which should be completed by twenty-two o'clock on the 31st, the first one is produced from fifteen to sixteen o'clock, the second from sixteen to seventeen o'clock, and the third from twenty-one to twenty-two o'clock on that day, and of the three products of type a which should be completed by nine o'clock of the 3rd day of the next month (because of the intervening weekend) the first is produced from four to five o'clock on the 31st, the second from five to six o'clock on the 31st, and the third from eight to nine o'clock on the 3rd. The number of type a products which should be produced from eight o'clock on the 31st to eight o'clock of the next working day (skipping the nonworking weekend days of Saturday and Sunday) is one from eight o'clock on the 31st to a time of switching of the cycle table (fourteen o'clock on Friday the 31st) and eight from the switching time to eight o'clock of the next working day (Monday the 3rd). In this way, the production schedule of FIG. 7 is made.

A production order schedule of the instant process is made at step 19 of FIG. 1 based on the production schedule obtained at step 18 of FIG. 1 and a production condition entered from a file of production condition. For example, as illustrated in FIG. 7, the number of type a products to be produced at the instant process for delivery to the following process A should be one in the period from eight to fourteen o'clock on Friday the 31st, and eight in the period from fourteen o'clock on the 31st to eight o'clock on the next working day (Monday the 3rd). Similarly, the number of type b products to be produced for delivery to the following process A should be four in the period from eight to fourteen o'clock on Friday the 31st, and three in the period from fourteen o'clock on the 31st to eight o'clock on the next working day. Therefore, one product of type a and four products of type b should be produced at the instant process from eight to fourteen o'clock on Friday the 31st, and eight products of type a and three products of type b are produced from fourteen o'clock of the 31st to eight o'clock on the next working day at the instant process.

FIG. 8 illustrates how to determine a production order for products of type a and for products of type b, to cause the instant process and the following processes to operate smoothly. More particularly, in FIG. 8, desired production magnitudes $Ka$ and $Kb$ for products of types a and b at eight o'clock on Friday the 31st are selected to be equal to the numbers of products to be produced from eight to fourteen o'clock (cycle switching time) on the 31st, as shown in FIG. 7, so that $Ka$ is selected to be 1 and $Kb$ is selected to be 4. Then, a desired production magnitude $Ka'$ at nine o'clock with respect to product type a is determined by equation, $Ka' = Ka + Ka - (Ka + Kb) \times P$, and a desired production magnitude $Kb'$ at nine o'clock with respect to product type b is determined by equation, $Kb' = Kb + Kb - (Ka + Kb) \times Q$. In this connection, P is 1 when there is a product of type a to be produced in the period from eight to nine o'clock on Friday the 31st, and P is 0 when there is no product of type a to be produced from eight to nine o'clock on the 31st. Similarly, Q is 1 when there is a product of type b to be produced in the period from eight to nine o'clock on the 31st, and Q is 0 when there is no product of type b to be produced in this period.

For example, a desired production magnitude of type a products at nine o'clock is 2 (=1+1−0), and a desired production magnitude of type b products at nine o'clock is 3 (=4+4−(1+4)). Similarly, a desired production magnitude of type a products at ten o'clock is 3 (=(1+1−0)+1−0), and a desired production magnitude of type b products is 2 (=(4+4−5)+4−5). A desired production magnitude of type a products at eleven o'clock is −1 (=(1+1−0+1−0)+1−5), and a desired production magnitude of type b products is 6 (=(4+4−5+4−5)+4−0). Skipping the rest time (twelve to thirteen o'clock), a desired production magnitude of type a products at thirteen o'clock is 0 (=(1+1−0+1−0+1−5)+1−0), and a desired production magnitude of type b products is 5 (=(4+4−5+4−5+4−0)+4−5). Desired production magnitudes of types a and b at each working hour from fourteen o'clock on Friday the 31st to eight o'clock on the next working day (Monday the 3rd) can be obtained in the same way as described above by selecting the desired production magnitudes of types a and b products at fourteen o'clock on the 31st to be 8 and 3, respectively, as shown in FIG. 7.

The desired production magnitudes of types and b products are then compared with each other at each working hour (eight o'clock, nine o'clock, ... ), and a product type having a larger desired production magnitude is selected to be the type of product to be produced at the time. In this way, a production order from eight to thirteen o'clock on Friday the 31st is determined to be b, b, a, b, b, and a production order from fourteen o'clock on the 31st to eight o'clock on the 3rd (the next working day) is determined to be a, b, a, a, a, b, a, a, a, b, a. This production order determining method stabilizes the production line.

At the next step 20 of FIG. 1, a stocking schedule is made based on the production order determined at step 19 and the product shipment schedule determined at step 14. At step 21, a stock supervision is executed based on the cumulative stock condition stored in a memory 22.

Figure 9:
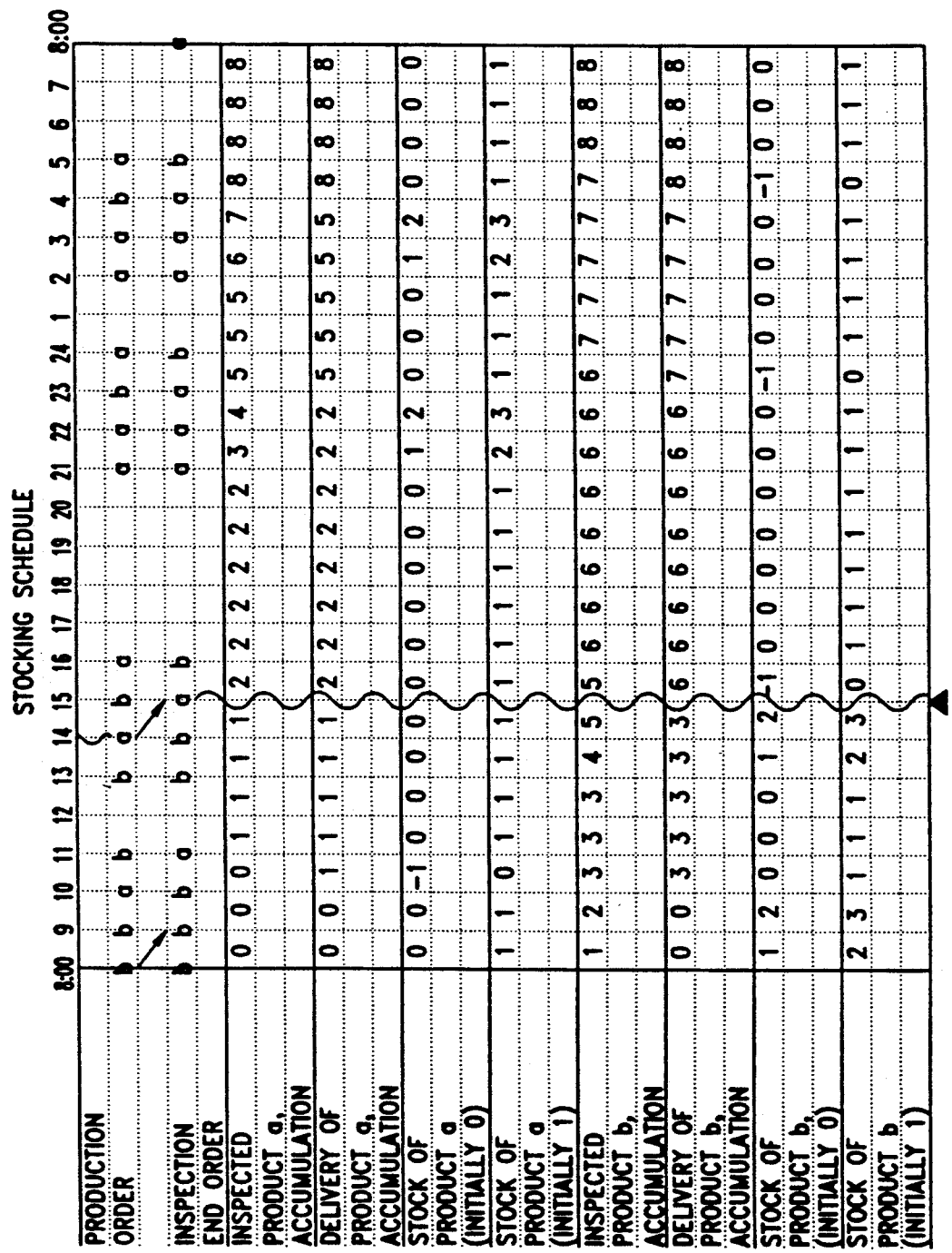
FIG. 9 is a table illustrating a stocking schedule of the instant process in accordance with the first embodiment of the present invention.

FIG. 9 illustrates how to make the stocking schedule. In a production order line of the table of FIG. 9, the production order determined by FIG. 8 is inserted. Since all the products are inspected, the same order as that of the production order but delayed by a lead time (for example, one hour) is inserted in an inspection end order line of FIG. 9. An inspection period of time is included in the lead time.

Then, cumulative numbers of the inspected type a products are inserted in "inspected product, a" line. More particularly, since one product of type a is inspected at eleven o'clock and the next product of type a is inspected at fifteen o'clock, the cumulative number is 0 up to eleven o'clock, 1 from eleven to fifteen o'clock, and 2 from fifteen o'clock. According to the product delivery schedule of FIG. 4, however, the number f type a products required to be ready for shipment from the instant process is one by ten o'clock, one by fifteen o'clock, three by twenty-three o'clock, and three by four o'clock, so a cumulative number of type a products dispatched is one from ten to fifteen o'clock, two from fifteen to twenty-three o'clock, five from twenty-three to four o'clock, and eight from four to eight o'clock, as shown in "delivery of product a" line of FIG. 9.

A stock number or inventory of type a products is calculated by subtracting the cumulative numbers of shipped products from the cumulative numbers of inspected products. More particularly, in a case where the stock number is initially zero, the stock number is 0 from eight to nine o'clock, 0 from nine to ten o'clock, −1 from ten to eleven o'clock, 0 from eleven to twelve o'clock, and so on. However, since a minus stock number means lack in stock of products, an alarm will occur in such a case so that an operator notices the lack. An initial stock number is determined so that no lack in stock of products will occur. For example, an initial stock number of 1 is selected for the type a products. The stock numbers of type b products are determined in the same way as for type a products.

Next, the second embodiment of the present invention will be explained with reference to FIGS. 10-20. The second embodiment corresponds to a case where extra work is scheduled on a holiday or weekend and the product delivery on the extra working day is controlled by a KANBAN for a normal working schedule. In this connection, the explanation made about FIG. 1 also applies to the second embodiment.

FIG. 10 illustrates a following process schedule which the second embodiment would have if the following process had no extra working. The schedule of FIG. 10 includes numbers of products needed by the following process with respect to respective product types a, b, . . . and respective days.

FIG. 11 illustrates an example where extra working is scheduled on Saturday the 1st at the following process A. More particularly, FIG. 11 illustrates that eight products are needed by the following process on the extra working day, that the number of products needed by the following process on the 3rd and 4th days is reduced by eight, and that the eight products to be delivered to the following process on the extra working day are produced on the 30th and 31st days at an instant process.

Because of the extra working, the following process schedule of FIG. 10 is modified to a schedule of FIG. 12. More particularly, it is planned that six products of type a and two products of type b are delivered to the following process on the 1st day, and eight are reduced from the numbers inserted in the 3rd day column and the 4th day column of FIG. 10.

Products are transported by trucks from the instant process to the following process in the numbers indicated in FIG. 12, in accordance with a truck delivery schedule and a KANBAN instruction which are shown in FIG. 13. In the example of FIG. 13, there are only two truck deliveries at ten o'clock and fifteen o'clock on the 1st day and there is a time lag of two truck deliveries between delivery of each KANBAN and delivery of the respective products, as instructed by the instruction "1-4-2" of the KANBAN.

Figure 14:
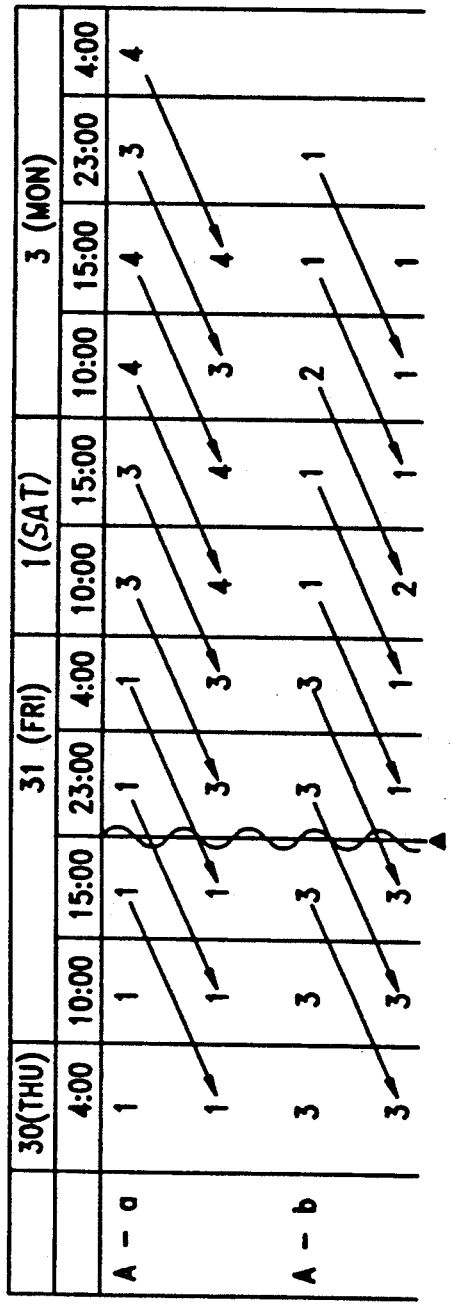
FIG. 14 is a table illustrating a product shipment schedule of the instant process in accordance with the second embodiment of the present invention.

As illustrated in FIG. 14, a product delivery schedule from the instant process is made based on the modified following process schedule of FIG. 12 and the truck delivery schedule of FIG. 13. More particularly, the numbers of products to be supplied to the following process are divided by the number of truck deliveries and are evenly distributed over the respective truck deliveries. Then, the distributed numbers are advanced by the time lag specified in the KANBAN, whereby the product delivery schedule from the instant process is made.

Figure 15:
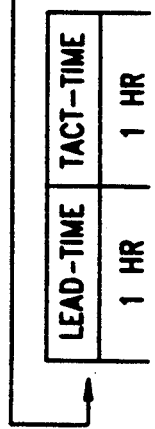
FIG. 15 is a table illustrating a working condition and a production condition of the instant process in accordance with the second embodiment of the present invention.
Figure 16:
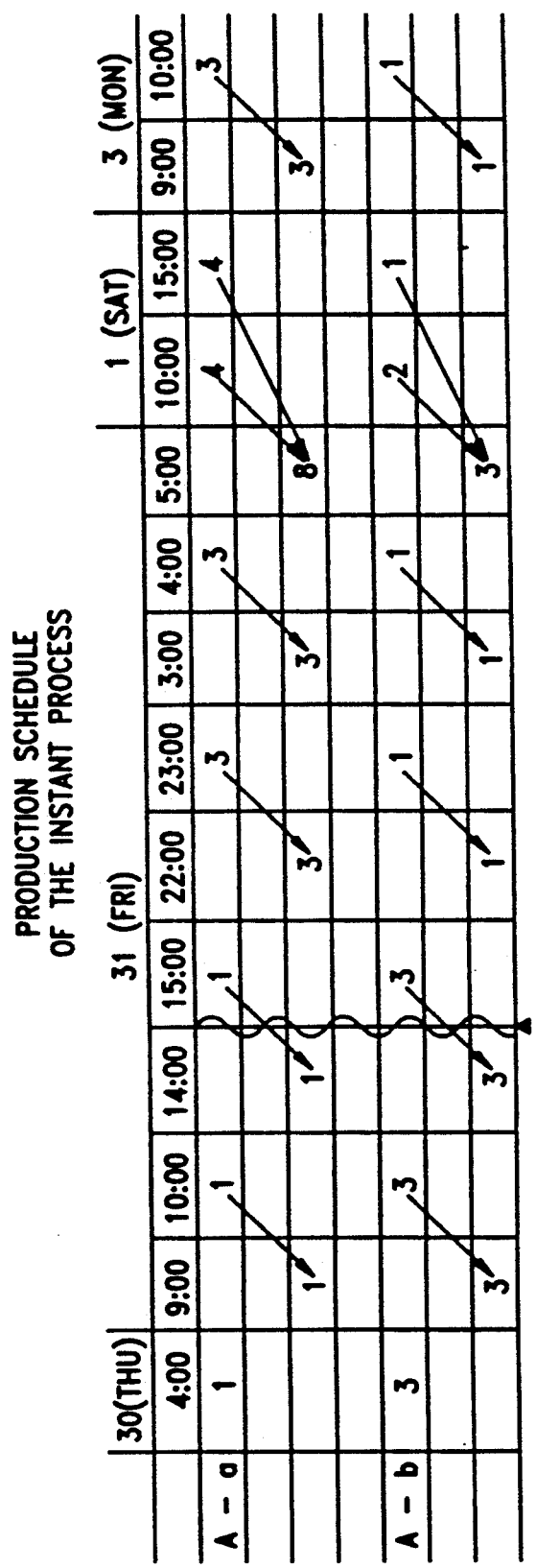
FIG. 16 is a table illustrating a production schedule of the instant process in accordance with the second embodiment of the present invention.

FIG. 15 illustrates a working condition and production condition of the instant process. As shown in FIG. 16, a production schedule of the instant process is made based on the product delivery schedule of the instant process of FIG. 14 and the working condition and production condition of the instant process of FIG. 15. This production schedule is made by advancing the product delivery schedule by a lead time (for example, one hour as shown in FIG. 15). In this instance, the products which should be supplied to the following process on the extra working day (Saturday the 1st) are planned to be produced on Thursday the 30th and Friday the 31st.

Figure 17:
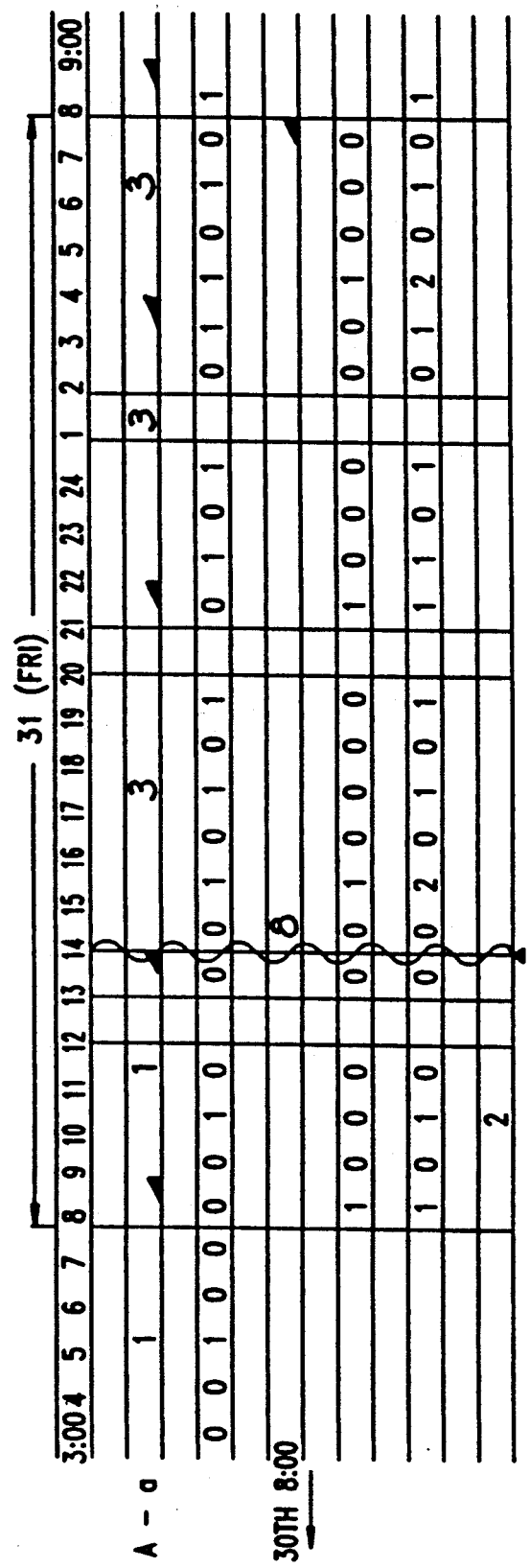
FIG. 17 is a table illustrating a detailed production schedule for production of type a products in accordance with the second embodiment of the present invention.

FIG. 17 illustrates a detailed production schedule of the instant process with respect to type a products. In FIG. 17, the numbers to be produced are distributed over actual working periods of time as evenly as possible. The numbers inserted in the first and second lines from the top of FIG. 17 correspond to the numbers of products to be produced which will be delivered to the following process on normal working days, and the numbers inserted in the third and fourth lines from top of FIG. 17 correspond to the numbers of products to be produced which will be delivered on the extra working day. In this instance, the number "8" in the third line corresponds to the number of products to be supplied on the extra working day, and the numbers "1, 0, 0, 0, 0, 0, 1, 0, 0, 0, 0, 1, 0, 0, 0, 0, 0, 1, 0, 0, 0" in the fourth line correspond to the numbers of products to be produced on Friday the 31st. The remaining four products will be produced on Thursday the 30th, but they are not shown in FIG. 17. The numbers in the fifth line from the top of FIG. 17 are summations of the numbers of the second line and the numbers of the fourth line. From this table, it will be understood that two products of type a are produced from eight to fourteen o'clock on the 31st, and eleven products of type a are produced from fourteen o'clock on the 31st to eight o'clock on the 1st.

Figure 18:
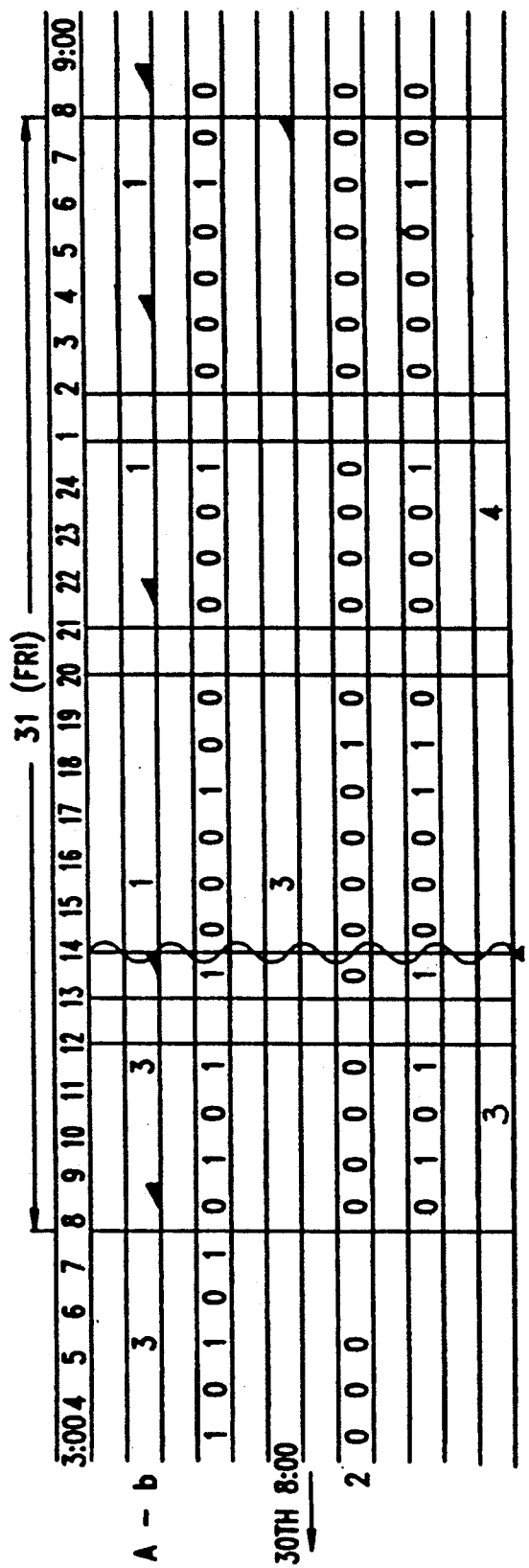
FIG. 18 is a table illustrating a detailed production schedule for production of type b products in accordance with the second embodiment of the present invention.

In the same way as for FIG. 17, a production schedule of the instant process with respect to type b products is made, as illustrated in FIG. 18.

Then, desired production magnitudes Ka and Kb of products of types a and b are calculated as illustrated in FIG. 19, based on the production schedules of FIGS. 17 and 18, in the same way as for the first embodiment, which was explained with reference to FIG. 8, and then the production order schedule of the instant process is made by selecting the largest desired production magnitude at each production time, to stabilize the production lines.

Figure 20:
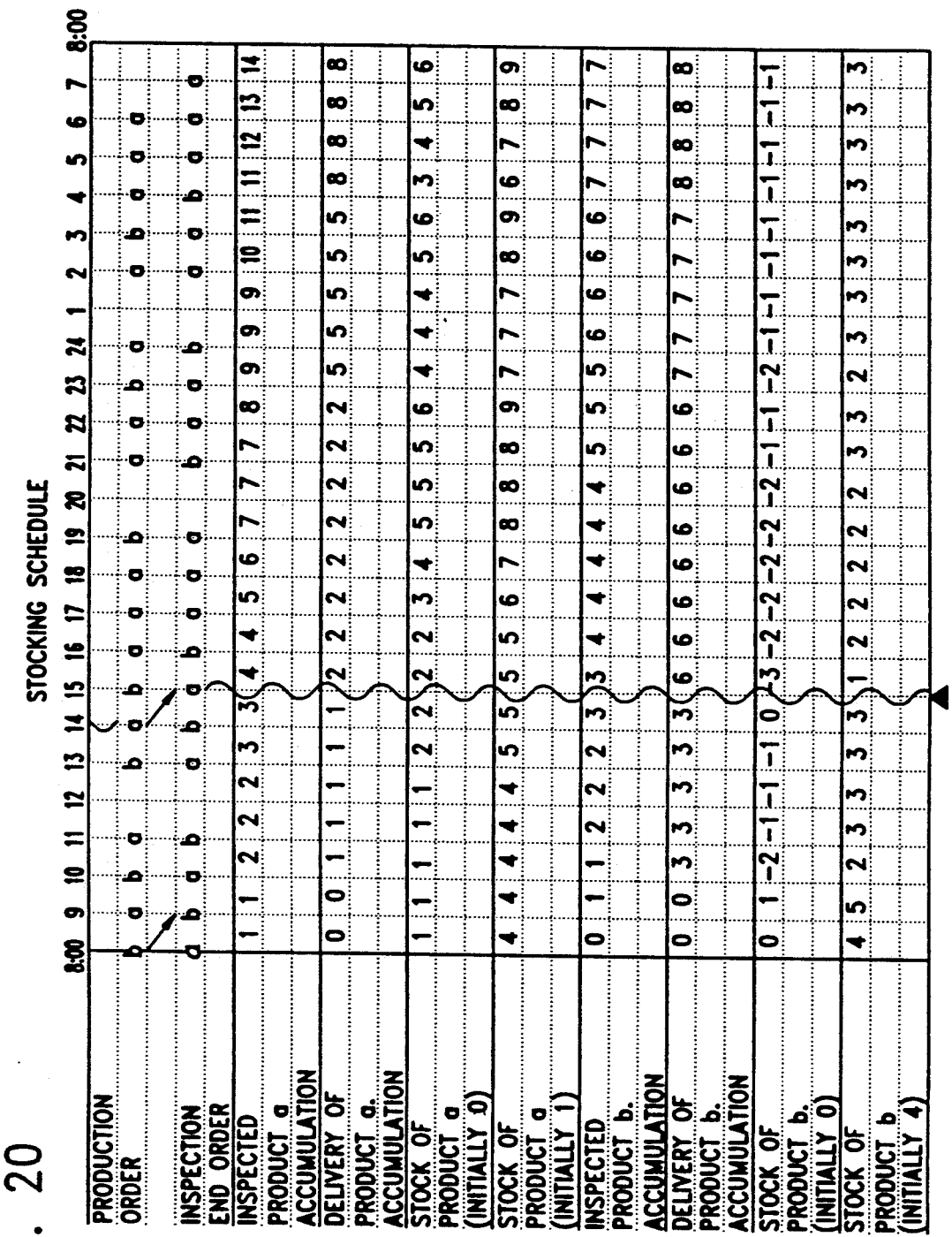
FIG. 20 is a table illustrating a stocking schedule of the instant process in accordance with the second embodiment of the present invention.

FIG. 20 illustrates a stocking schedule of product types a and b that is made based on the production order schedule of FIG. 19. This stocking schedule is made in the same way as that of the first embodiment, which was explained with reference to FIG. 9.

Next, the third embodiment of the present invention will be explained with reference to FIGS. 21-31. The third embodiment corresponds to a case where extra working is scheduled on a weekend or holiday and the product delivery on the extra working day is controlled by a special or extra KANBAN. In this connection, the explanation made about FIG. 1 also applies to the third embodiment.

FIG. 21 illustrates a following process schedule which the following process would have if the following process had no working on a weekend. The schedule of FIG. 21 includes the numbers of products needed by the following process with respect to product types and days.

FIG. 22 illustrates one example where extra working is scheduled on Saturday the 1st at the following process A. More particularly, FIG. 22 illustrates that twelve products are shifted from the normal working days of Monday the 3rd and Tuesday the 4th to the extra working day on the 1st. Therefore, twelve products will be delivered to the following process on Saturday the 1st, and twelve products are reduced from the products handled on Monday the 3rd and Tuesday the 4th. FIG. 22 also illustrates that the twelve products to be supplied to the following process on the 1st are produced on the 30th and 31st at the instant process.

Because of the extra working, the following process schedule of FIG. 21 is modified to a schedule shown in FIG. 23. More particularly, it is planned that nine products of type a and three products of type b are supplied to the following process on Saturday the 1st, and nine products of type a and three products of type b are reduced from the products to be supplied on Monday the 3rd and Tuesday the 4th in FIG. 21.

Products are supplied from the instant process to the following processes in accordance with a truck delivery schedule and a KANBAN instruction which are shown in FIG. 24. As illustrated in FIG. 24, there are only two truck deliveries at ten o'clock and at fifteen o'clock on the extra working day of Saturday the 1st, and delivery of the products to be supplied on the extra working day is controlled by a special KANBAN in which there is no time lag between delivery of the KANBAN and delivery of the corresponding products. The special KANBAN has an instruction of "1-2-0" which means that there are two truck deliveries on one extra working day, and there is no time lag between delivery of the KANBAN and delivery of the corresponding products.

Figure 25:
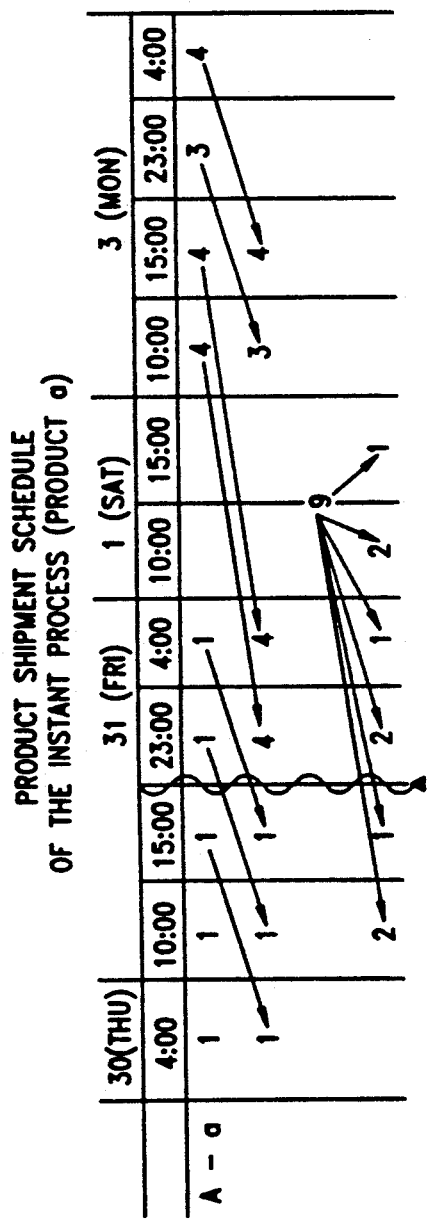
FIG. 25 is a table illustrating a product shipment schedule of the instant process with respect to production of type a products in accordance with the third embodiment of the present invention.
Figure 26:
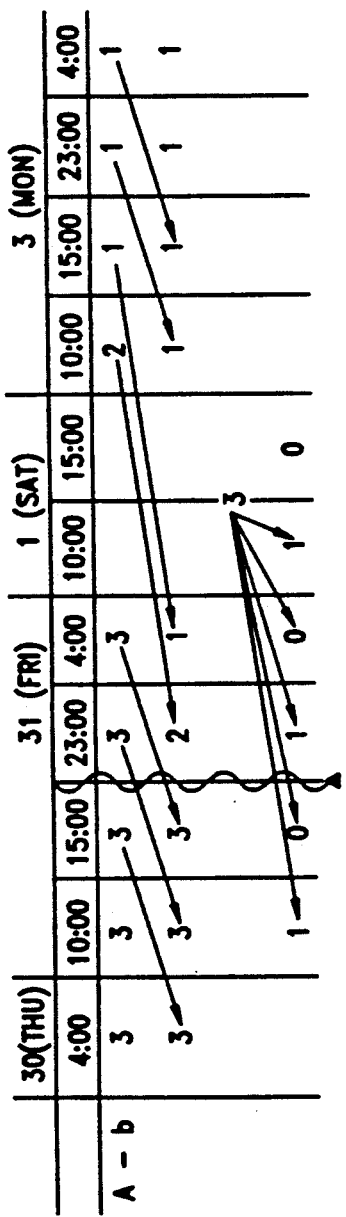
FIG. 26 is a table illustrating a product delivery schedule of the instant process with respect to production of type b products in accordance with the third embodiment of the present invention.

As illustrated in FIG. 25, a product delivery schedule of the instant process is made based on the modified following process schedule of FIG. 23, the truck delivery schedule of FIG. 24, and the KANBAN instruction of FIG. 24. More particularly, with respect to the products to be supplied to the following processes on the normal working days, the number of the products is divided by the number of truck deliveries, and the divided numbers are distributed over the respective truck deliveries as evenly as possible. Then, the numbers of the products distributed over the respective truck deliveries are advanced by the time lag between delivery of the KANBAN and delivery of products specified in the normal KANBAN. On the other hand, with respect to the products to be supplied to the following processes on the extra working day, the numbers of the products to be supplied to the following process are distributed over both the extra working day itself and the preceding normal working day or days as evenly as possible. The distributed numbers are not advanced because there is no time lag between delivery of the KANBAN and delivery of products according to the special KANBAN. FIG. 26 illustrates a product delivery schedule of the instant process with respect to products of type b, which is made in the same way as that of products a.

FIG. 27 illustrates a working condition and production condition of the instant process including a lead time and a tact-time.

Figure 28:
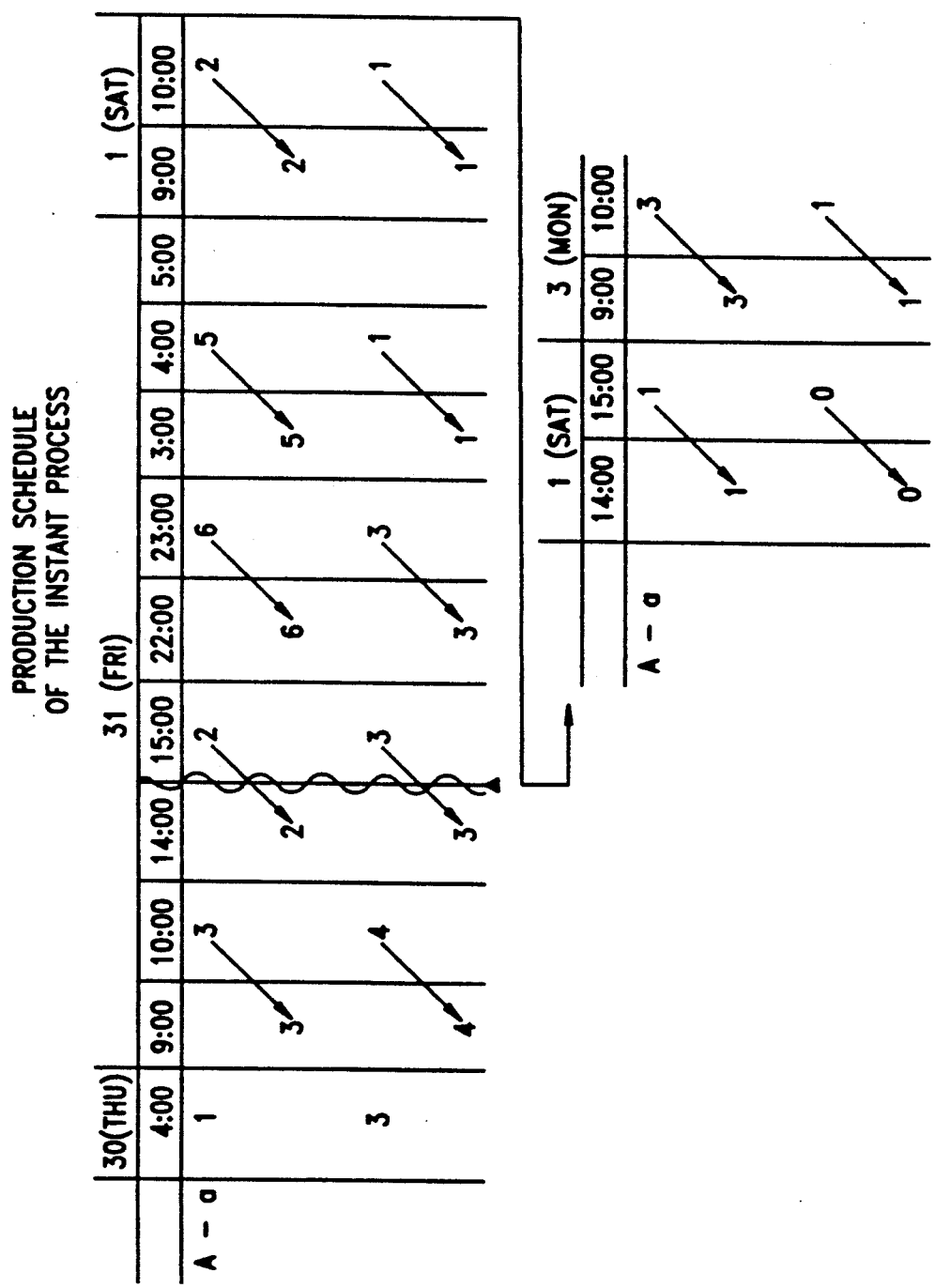
FIG. 28 is a table illustrating a production schedule of the instant process in accordance with the third embodiment of the present invention.

As shown in FIG. 28, a production schedule for the instant process is made based on the product delivery schedules of FIGS. 25 and 26 and the working condition and production condition of the instant process of FIG. 27. This production schedule is made by advancing the product delivery schedule by a lead time (one hour, see FIG. 27). In this instance, the products (nine products of type a and three products of type b) which should be supplied to the following process on the extra working day (Saturday the 1st) are scheduled to be produced over both Saturday the 1st and Friday the 31st. FIG. 28 also shows that three products of type a are produced and one product of type b is produced on the 1st.

Figure 29:
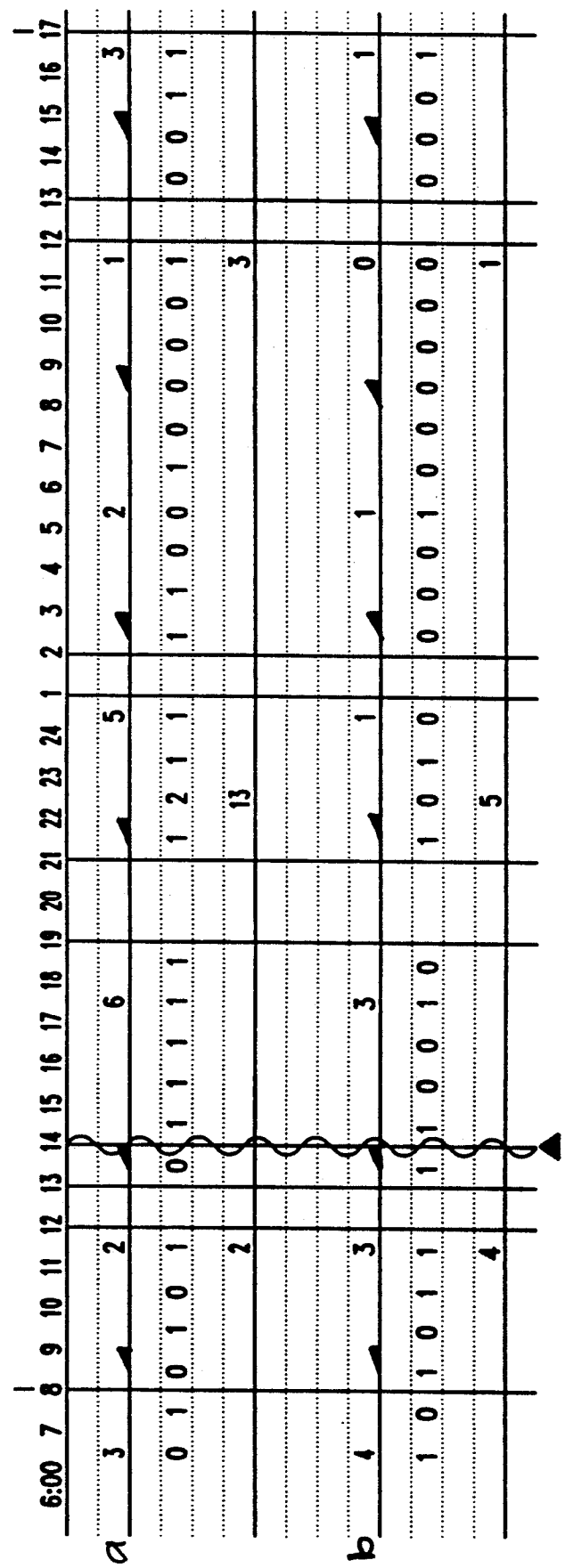
FIG. 29 is a table illustrating a detailed production schedule of the instant process in accordance with the third embodiment of the present invention.

FIG. 29 illustrates a detailed production schedule of the instant process with respect to product types a and b. In FIG. 29, the numbers of products to be produced shown in FIG. 16 are distributed over corresponding actual working periods of time as evenly as possible.

Desired production magnitudes Ka and Kb of products a and b are then calculated as illustrated in FIG. 30, based on the production schedule of FIG. 29, in the same way as for the first embodiment which was explained with reference to FIG. 8, and a product type that has the largest desired production magnitude is selected at respective production times so that the production order of product types a and b is determined.

Figure 31:
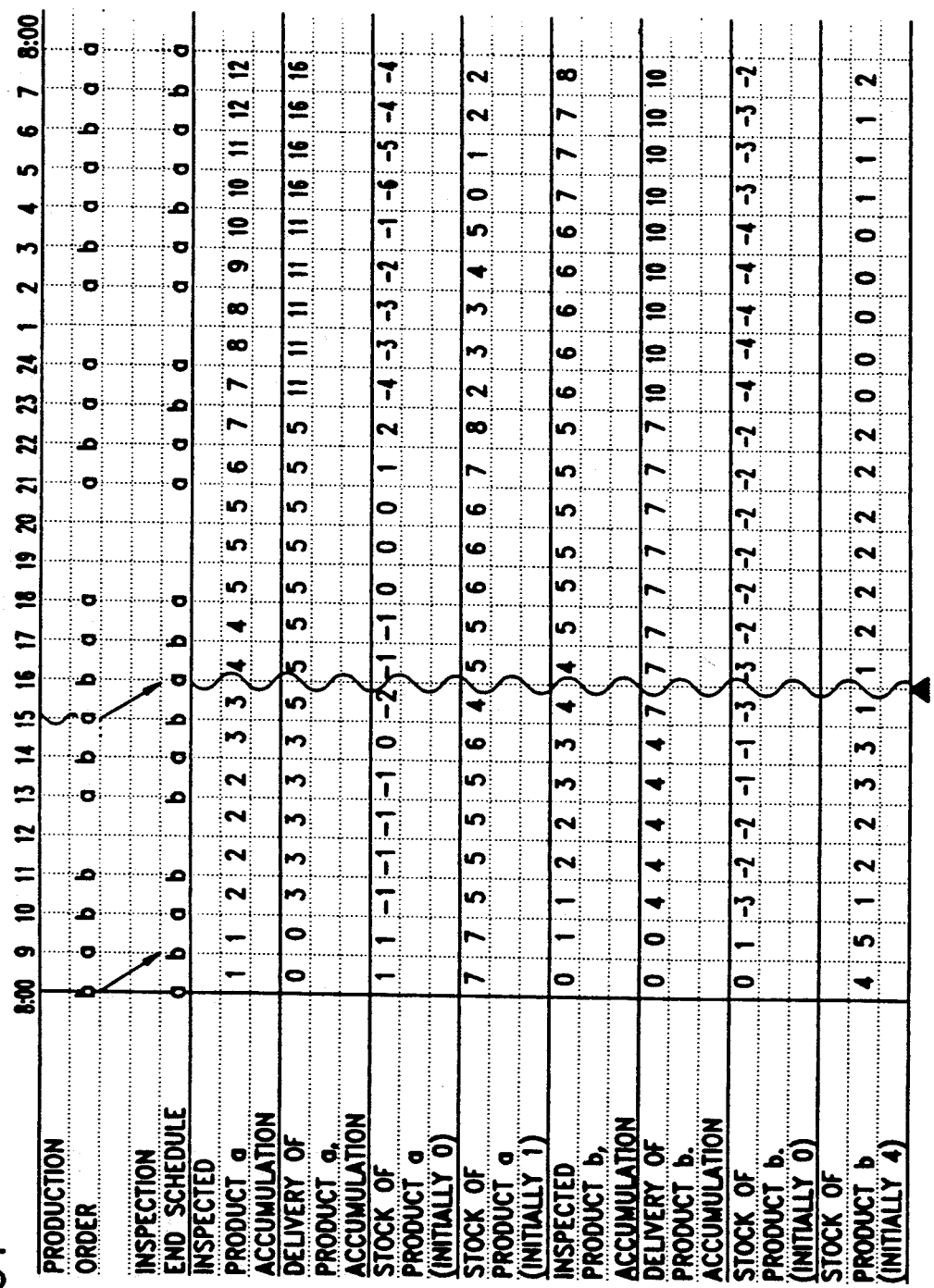
FIG. 31 is a table illustrating a stocking schedule of the instant process in accordance with the third embodiment of the present invention.

FIG. 31 illustrates a stocking schedule of the instant process that is made based on the production order schedule of FIG. 30. This stocking schedule is made in the same way as that of the first embodiment which was explained with reference to FIG. 9.

In accordance with any of the first, second and third embodiments, since a production schedule of the instant process is made taking a truck delivery schedule into consideration, both a lack in supply of products and an extra stocking of products are effectively prevented. As a result, the production lines are stabilized.

Although a few embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A method for making a production schedule for an instant process that produces a plurality of types of products and supplies the products to a plurality of second processes by trucks, the method comprising the steps of:

recording a second process schedule which includes numbers of products needed by the second process with respect to respective product types and respective days;

recording a truck delivery schedule from the instant process to the second process and information included in a card called a KANBAN which is carried by each truck between the instant process and the second processes and which includes information about delivery types;

determining a product shipment schedule of the instant process based on the second process schedule, the truck delivery schedule, and the KANBAN information;

recording a working condition and a production condition of the instant process;

determining a production schedule of the instant process based on the product shipment schedule, the working condition of the instant process, and the production condition of the instant process; and determining a production order of the products to be produced at the instant process based on the production schedule of the instant process.

2. A method according to claim 1, wherein each of the second processes comprises a process including a normal working condition in which no work is scheduled on a weekend or holiday, and the KANBAN comprises an ordinary KANBAN in which there is a time lag between delivery of the KANBAN and delivery of the products corresponding to the KANBAN.

3. A method according to claim 1, wherein at least one of the second processes comprises a process including an extra working condition in which work is scheduled on a weekend or holiday, and the KANBAN comprises an ordinary KANBAN in which there is a time lag between delivery of the KANBAN and delivery of the products corresponding to the KANBAN.

4. A method according to claim 1, wherein at least one of the second processes comprises a process including an extra working condition in which work is scheduled on a weekend or holiday, and the KANBAN comprises an special KANBAN in which there is no time lag between delivery of the KANBAN and delivery of the products corresponding to the KANBAN.

5. A method according to any one of claims 3 and 4, wherein the following process schedule comprises a schedule in which the numbers of products needed by the second process are modified so as to include also a number of products needed by the following process on the extra working day.

6. A method according to any one of claims 1, 2, 3, and 4, and further comprising a step of making a stocking schedule of the instant process based on the determined production order of the products to be produced at the instant process.

7. A method according to any one of claims 1, 2, 3, and 4, wherein the truck delivery schedule comprises a schedule specifying times when the trucks reach the second processes.

8. A method according to any one of claims 1, 2, 3, and 4, wherein the KANBAN comprises a KANBAN specifying a number of truck deliveries per day and a time lag between delivery of the KANBAN and delivery of the products corresponding to the KANBAN.

9. A method according to any one of claims 1, 2, 3, and 4, wherein the step of determining a product shipment schedule of the instant process includes steps of:
dividing the numbers of the plurality of types of products needed by the second processes specified in the following process schedule by the number of truck deliveries specified in the KANBAN and distributing the divided numbers over the respective truck deliveries; and
advancing the distributed numbers by the time lag specified in the KANBAN.

10. A method according to any one of claims 1, 2, 3, and 4, wherein the step of determining a production schedule of the instant process includes a step of distributing the numbers of products specified in the product delivery schedule of the instant process over actual working periods of time as evenly as possible.

11. A method according to any one of claims 1, 2, 3, and 4, wherein the step of determining a production order of products to be produced at the instant process includes steps of:
calculating desired production magnitudes with respect to respective types of products and respective actual working times; and
determining a product type having a maximum desired production magnitude at an actual working time as the product to be produced at the time.

12. A method according to claim 6, wherein the step of making a stocking schedule of the instant process comprises step of:
determining an inspection order of products based on the production order of products;
determining cumulative numbers of inspected products with respect to respective times and respective types of products;
determining cumulative numbers of delivered products with respect to respective times and respective types of products based on the product shipment schedule;
subtracting the cumulative numbers of delivered products from the cumulative numbers of inspected products to obtain numbers of products stocked at the instant process with respect to respective types of products and respective times; and
adjusting initial stock numbers of products at the instant process so that the numbers of stocked products at respective times are not negative.

* * * * *